US006557145B2

(12) United States Patent
Boyle et al.

(10) Patent No.: US 6,557,145 B2
(45) Date of Patent: *Apr. 29, 2003

(54) METHOD FOR DESIGN OPTIMIZATION USING LOGICAL AND PHYSICAL INFORMATION

(75) Inventors: Douglas B. Boyle, Palo Alto, CA (US); James S. Koford, San Jose, CA (US)

(73) Assignee: Monterey Design Systems, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/801,010

(22) Filed: Mar. 6, 2001

(65) Prior Publication Data

US 2001/0010090 A1 Jul. 26, 2001

Related U.S. Application Data

(63) Continuation of application No. 09/097,299, filed on Jun. 12, 1998, now Pat. No. 6,286,128, which is a continuation-in-part of application No. 09/021,973, filed on Feb. 11, 1998, now Pat. No. 6,099,580.

(51) Int. Cl.[7] .............................................. G06F 17/50
(52) U.S. Cl. .................................. 716/2; 716/7; 716/8
(58) Field of Search ............................. 716/2, 7, 8, 6, 716/18

(56) References Cited

U.S. PATENT DOCUMENTS

| 5,495,419 A | 2/1996 | Rostoker et al. ............ 364/468 |
| 5,566,078 A | 10/1996 | Ding et al. .................. 364/490 |
| 5,568,636 A | 10/1996 | Koford ........................ 395/500 |
| 5,661,663 A | 8/1997 | Scepanovic et al. ........ 364/490 |
| 5,682,321 A | 10/1997 | Ding et al. .................. 364/490 |
| 5,682,322 A | 10/1997 | Boyle et al. ................ 364/491 |
| 5,712,793 A * | 1/1998 | Scepanovic et al. ........ 364/490 |
| 5,798,936 A | 8/1998 | Cheng ......................... 364/489 |
| 5,838,583 A | 11/1998 | Varadarajan et al. ........ 364/491 |
| 5,838,585 A | 11/1998 | Scepanovic et al. ........ 364/491 |
| 5,847,965 A | 12/1998 | Cheng ......................... 364/488 |
| 5,859,782 A | 1/1999 | Scepanovic et al. ........ 364/491 |
| 5,870,313 A | 2/1999 | Boyle et al. ................ 364/491 |
| 5,875,117 A | 2/1999 | Jones et al. ................. 364/491 |
| 5,963,455 A | 10/1999 | Scepanovic et al. ........ 364/491 |
| 6,009,248 A * | 12/1999 | Sato et al. ...................... 716/2 |
| 6,070,108 A | 5/2000 | Andreev et al. ............. 700/121 |
| 6,085,032 A | 7/2000 | Scepanovic et al. ... 395/500.11 |
| 6,088,519 A | 7/2000 | Koford ..................... 395/500.1 |
| 6,093,214 A | 7/2000 | Dillon .......................... 716/17 |
| 6,099,580 A * | 8/2000 | Boyle et al. ................... 716/7 |
| 6,145,117 A * | 11/2000 | Eng ............................. 716/18 |
| 6,155,725 A | 12/2000 | Scepanovic et al. ..... 395/500.1 |
| 6,230,304 B1 | 5/2001 | Groeneveld et al. ........... 716/7 |
| 6,243,849 B1 | 6/2001 | Singh et al. .................... 716/8 |
| 6,249,902 B1 | 6/2001 | Igusa et al. ................... 716/10 |
| 6,269,469 B1 | 7/2001 | Pavisic et al. ................ 716/12 |
| 6,286,128 B1 * | 9/2001 | Pileggi et al. ................ 716/18 |

* cited by examiner

Primary Examiner—Vuthe Siek
(74) Attorney, Agent, or Firm—Vierra Magen Marcus Harmon & DeNiro LLP

(57) ABSTRACT

A method for design optimization using logical and physical information is provided. In one embodiment, a method for design optimization using logical and physical information, includes receiving a behavioral description of an integrated circuit or a portion of an integrated circuit, optimizing placement of circuit elements in accordance with a first cost function, and optimizing logic of the circuit elements in accordance with a second cost function, in which the optimizing placement of the circuit elements and the optimizing logic of the circuit elements are performed concurrently. The method can further include optimizing routing in accordance with a third cost function, in which the optimizing routing, the optimizing placement of the circuit elements, and the optimizing logic of the circuit elements are performed concurrently.

24 Claims, 8 Drawing Sheets

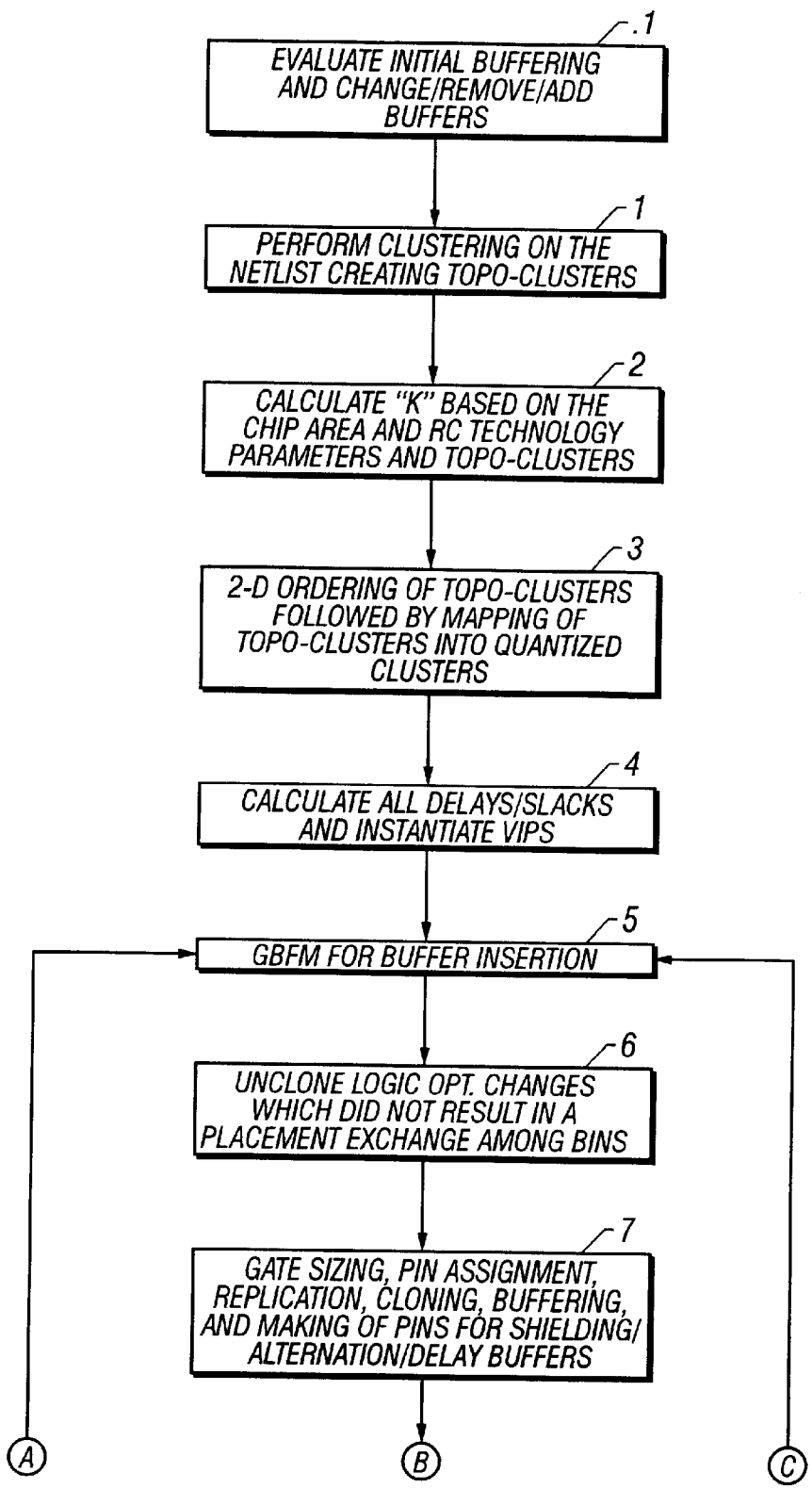
FIG. 7-A

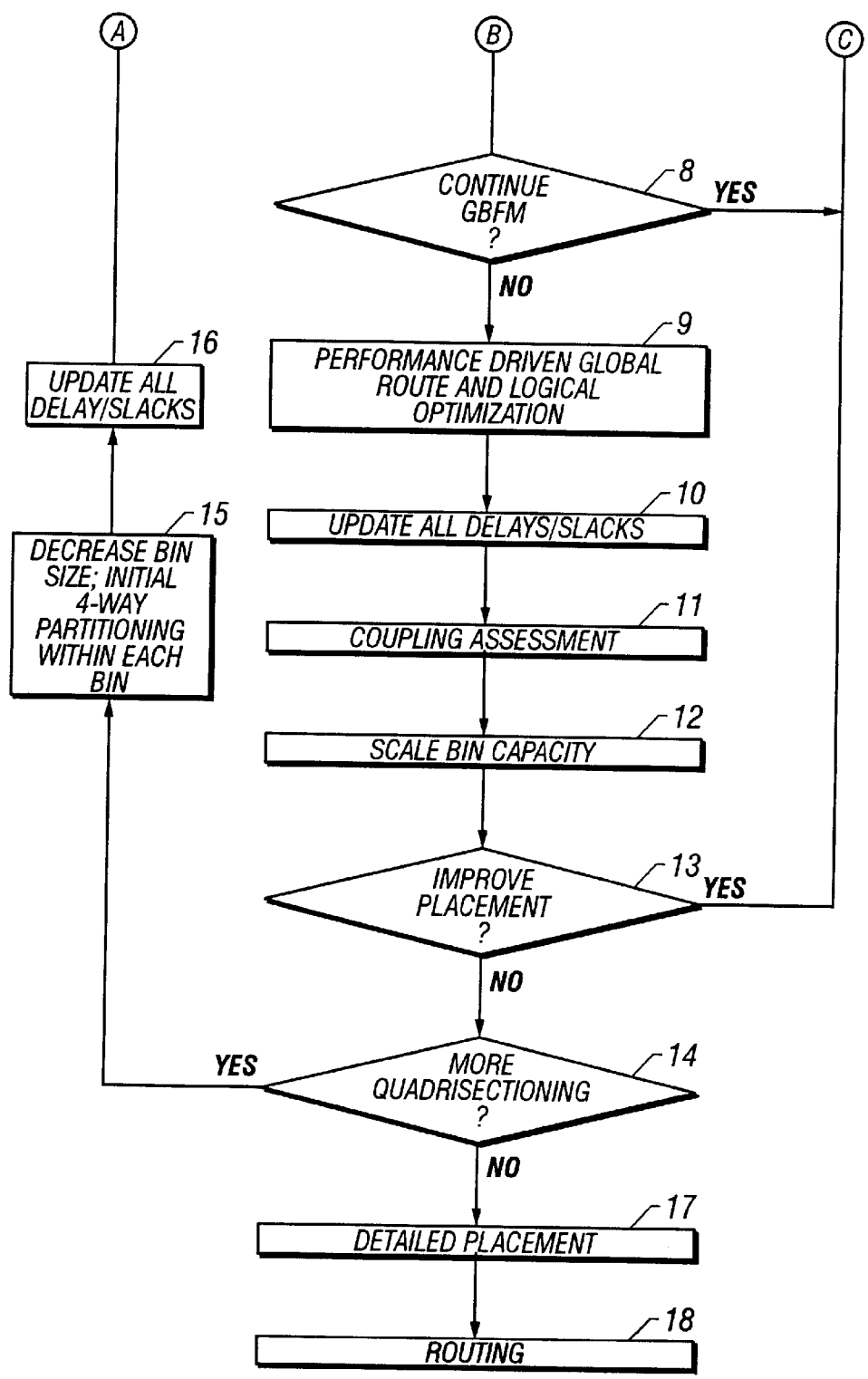
FIG. 7-B

US 6,557,145 B2

METHOD FOR DESIGN OPTIMIZATION USING LOGICAL AND PHYSICAL INFORMATION

CROSS-REFERENCE TO RELATED PATENT APPLICATIONS

The present application is a continuation application of U.S. patent application Ser. No. 09/097,299, entitled "Method for Design Optimization Using Logical and Physical Information," by Douglas B. Boyle et al., filed on Jun. 12, 1998, now U.S. Pat. No. 6,286,128, which is a continuation-in-part application of U.S. patent application Ser. No., 09/021,973, entitled "Performance Driven Design Optimization Using Logical and Physical Information," by Douglas B. Boyle et al., filed Feb. 11, 1998, now U.S. Pat. No. 6,099,580, issued Aug. 8, 2000. U.S. patent application Ser. Nos. 09/097,299 and 09/021,973 are both assigned to Monterey Design Systems, Inc., which is also the Assignee of the present application.

BACKGROUND OF THE INVENTION

1. Field of the Invention

The present invention relates to integrated circuit design tools. In particular, the present invention relates to integrated circuit design tools that optimize area performance and signal integrity in integrated circuits.

2. Discussion of the Related Art

Existing top-down design methods focus on optimizing transistors and gates, and model interconnect lines as merely "parasitic" elements of these transistors and gates. Implicit in this view of interconnect lines is the assumption that wiring delays and congestion in the interconnect lines are secondary to transistors and gates, and therefore can be taken into account as corrections to the timing and density models of the transistor and gates. As feature sizes of integrated circuits continue to shrink, this assumption is clearly no longer valid. In fact, interconnect is expected to dominate both performance and density in the near future.

FIG. 1 shows a typical existing design method 100. As shown in FIG. 1, an integrated circuit design is captured by a design entry step 101. Design entry step 101 is typically facilitated by a design capture system allowing the user to specify the logic design of the integrated circuit graphically, through a hardware description language (e.g., VHDL), or both. Typically, at design entry step 101, the user need not specify all elements of the design at the logic gate level. Many elements can be specified at a higher functional level (e.g., register-transfer level).

Upon completion of design entry step 101, a functional simulation step 102 is typically carried out using a functional simulator to verify functional behavior of the design. Based on a verified functional level description ("functional design"), the functional design can then be synthesized to the logic gate level in logic synthesis step 104, using a logic synthesis tool. Typically, at logic synthesis step 104, additional circuits for diagnostic and test purposes are included to provide a synthesized logic circuit ("gate-level design"). Such additional circuits may include, for example, test circuits for a boundary scan design under the JTAG standard.

Using the gate-level design, an initial circuit partitioning can be performed, i.e., floor planning step 103, to allow a first estimate of circuit size and to group highly connected portions of the design together to facilitate a subsequent layout step. In addition, a logic simulation (simulation step 109) and a static timing analysis (timing analysis step 108) are performed on the gate-level design to verify the gate-level design's functional behavior, and to extract estimates of timing parameters.

During this time, at formal verification step 107 and test structure verification step 106, the gate-level design is verified against both the functional design and a behavior description of the additional included circuits to ensure both the functional design's and the test structure's behaviors are preserved. Further, the gate-level design is also checked, at technology checking step 105, that technology-specific logic design rules are not violated.

The gate-level design, together with timing information from the static timing analysis, are integrated into a pre-layout design database in front-end processing step 110. At this time, a pre-layout signoff step 111 signifies the beginning of the physical realization phase of the integrated circuit design. FIG. 1 shows a layout step 112 in which the physical realization ("layout") is created by performing a number of tasks ("layout design tasks") iteratively.

Typically, layout design tasks include, generally, the steps of circuit partitioning, placement and routing. As mentioned above, an initial circuit partition based on the gate-level design is already provided at floor-planning step 103. Based on this initial partition, the circuit partitioning step in layout step 112 further refines circuit partitions down to the level of individual "cells" (e.g., logic gates or macro cells). These cells are then placed according to some constraints, which are typically expressed by a cost function. Typical constraints relate to area, power and local timing. The cells so placed are then routed to provide the necessary interconnect. The routing is also typically performed according to certain constraints, such as local timing and power constraints.

In the prior art, a final static timing analysis step 113 is then performed on the routed layout design, incorporating into the timing information delays introduced by the routing step. If final static timing analysis step 113 uncovers timing problems in some signal paths, an optimization cycle is initiated by flagging the gates along the problematic signal paths and returning the gate-level design back to logic synthesis step 104. In logic synthesis step 104, logic synthesis techniques are applied to improve the gate-level design in a revised gate-level design. Steps 105–113 are then repeated on the revised gate-level design. This optimization cycle is repeated until all timing problems are resolved, represented by the post-layout sign-off step 114. Test patterns can then be generated in an automatic test pattern generation (ATPG) step 116, and the final layout design can then be manufactured.

The existing top-down design methods not only suffer from the defective interconnect model mentioned above, but also from the long elapsed time between optimization cycles. With each optimization cycle, the logic synthesis, circuit partitioning, placement and routing are "point" tools, each operating on the entire design. Such loose coupling between tools in this optimization cycle is inefficient, since the steps towards convergence to an optimized layout tend to be small for each optimization cycle. For example, any possible improvement realizable by resynthesis of the logic circuit that arises because of a different placement of cells cannot be taken advantage of until the next optimization cycle. Furthermore, at the current and future circuit densities, the amount of CPU cycles used in each point tool in the optimization cycle is enormous, with many cycles expended in repeating tasks also performed in the previous optimization cycles. Further, since each existing point tool is typically acquired from a different vendor, there is substantial inefficiency in the interface between point tools. Typically, each point tool reads into memory a large data file provided by an upstream point tool, and provides its results in another large data file to be read by a downstream point tool.

The long optimization cycles can be alleviated somewhat by the use of parallel point tools. An example of such a parallel point tool is disclosed in U.S. Pat. No. 5,495,419 to Rostoker et al., entitled "INTEGRATED CIRCUIT PHYSICAL DESIGN AUTOMATIC SYSTEM UTILIZING OPTIMIZATION PROCESS DECOMPOSITION AND PARALLEL PROCESSING," issued Feb. 27, 1996. In Rostoker et al, a parallel placement algorithm is executed by parallel processors, thereby shortening the time to achieve the placement function.

Thus, a method is desired for optimizing the integrated circuit design process, which both takes advantage of parallel algorithms and closely couples the layout design tasks in the optimization cycle is desired.

SUMMARY OF THE INVENTION

The present invention provides a method for optimizing a layout design, which minimizes the optimization cycle by incorporating interconnect wiring delays and performing logic optimization in the placement and routing operations. In one embodiment of the present invention, the method includes the steps of: (a) obtaining a first placement of circuit elements of a gate-level circuit; (b) providing routing between circuit elements; (c) performing a timing analysis to provide estimates of interconnect delay between circuit elements; (d) performing a logic optimization operation to obtain a second gate-level design based on a cost function. The steps (a)–(d) are reiterated until the cost function becomes less than a predetermined threshold. In one embodiment, a clustering of circuit elements allows circuit elements having high connectivity amongst them to be kept together and thus placed in close proximity of each other, while minimizing inter-cluster interconnect wiring delays.

In that embodiment, the method is iterated over an outer-loop in which each iteration divides circuit elements into clusters and applies steps (b) through (e) on the clusters until the cluster includes only primitive circuit elements.

In one embodiment, the logic optimization operation, which is performed concurrently with the placement and routing operations, (i) reassigns circuit elements between clusters, (ii) inserts or deletes signal buffers between circuit elements (iii) synthesizes alternative implementations of logic functions.

The method of the present invention can be implemented in a parallel processing design automation system to achieve high performance. Such a parallel processing system includes (a) multiple central processing units (CPUs) executing independently of each other; (b) a shared memory accessible by each CPU for holding data structures of the integrated circuit design; and (c) a control program managing a task list which specifies tasks for optimizing the integrated design. The control program assigns tasks on the task list to each of the CPUs. The tasks include placement, performance analysis, logic optimization and routing. The control program provides a locking mechanism for locking data structures stored in the shared memory to support concurrent operations by the CPUs each accessing the integrated circuit design represented by the data structures. Further, the parallel processing design automation system supports multithread execution. Parallelism is further enhanced by adopting algorithms for placement, timing analysis, logic optimization and routing suitable for parallel execution by the multiple CPUs each accessing the design data structures stored in the shared memory.

The present invention is better understood upon consideration of the detailed description below in conjunction with the accompanying drawings.

BRIEF DESCRIPTION OF THE DRAWINGS

FIG. 7(a) contains a first part of a flow diagram of a method of optimizing interconnect performance in accordance with one embodiment of the present invention; and FIG. 7(b) contains the remainder of the flow diagram of FIG. 7(a).

DETAILED DESCRIPTION OF THE PREFERRED EMBODIMENTS

Figure 1:
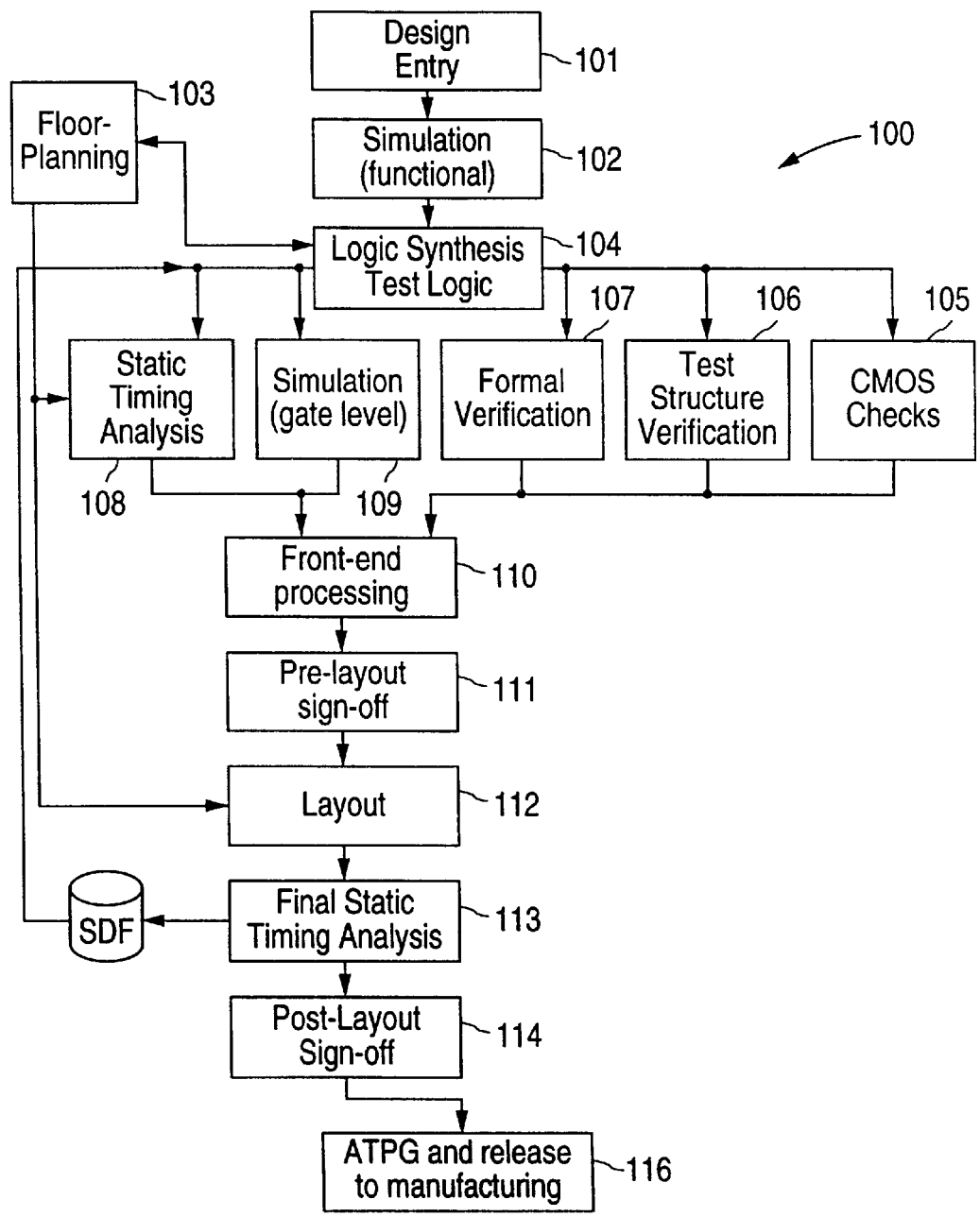
FIG. 1 shows an existing method 100 for designing an integrated circuit in the prior art.

The present invention provides a method for design optimization using logical and physical information. In one embodiment, a method for design optimization using logical and physical information eliminates, or at least tightens as much as possible, the manual iteration loops between synthesis, placement, and timing/power analysis, and provides a complete methodology for interconnect-centric IC design. A large part of this methodology can be implemented using parallel computing. In particular, global aspects of the design are optimized so that the detailed routing problem is feasible. The logic optimization and placement are performed such that interconnect with a predictable delay is concurrently placed with the logic circuitry. The placed interconnect congestion is then optimized to ensure design feasibility. A cost function is a combination of timing and physical design area. It is expected that physical design area will be primarily constrained by interconnect congestion. This embodiment, therefore, concurrently optimizes logic and physical information so that there are no congestion or timing "hot spots" when the logic circuitry and predictable-interconnect are properly placed. Visualizing a contour plot of a chip surface, this will optimize toward a uniform contour for both (smeared) interconnect congestion and timing slacks to minimize peaks or valleys. Peaks being an obvious problem, whereas valleys indicate wasted resources.

The present invention provides a performance-driven method for designing an integrated circuit, which can be used in conjunction with a parallel processing computer system. To simplify discussion and to facilitate cross reference among the figures, like elements in the figures are given like reference numerals.

Figure 2:
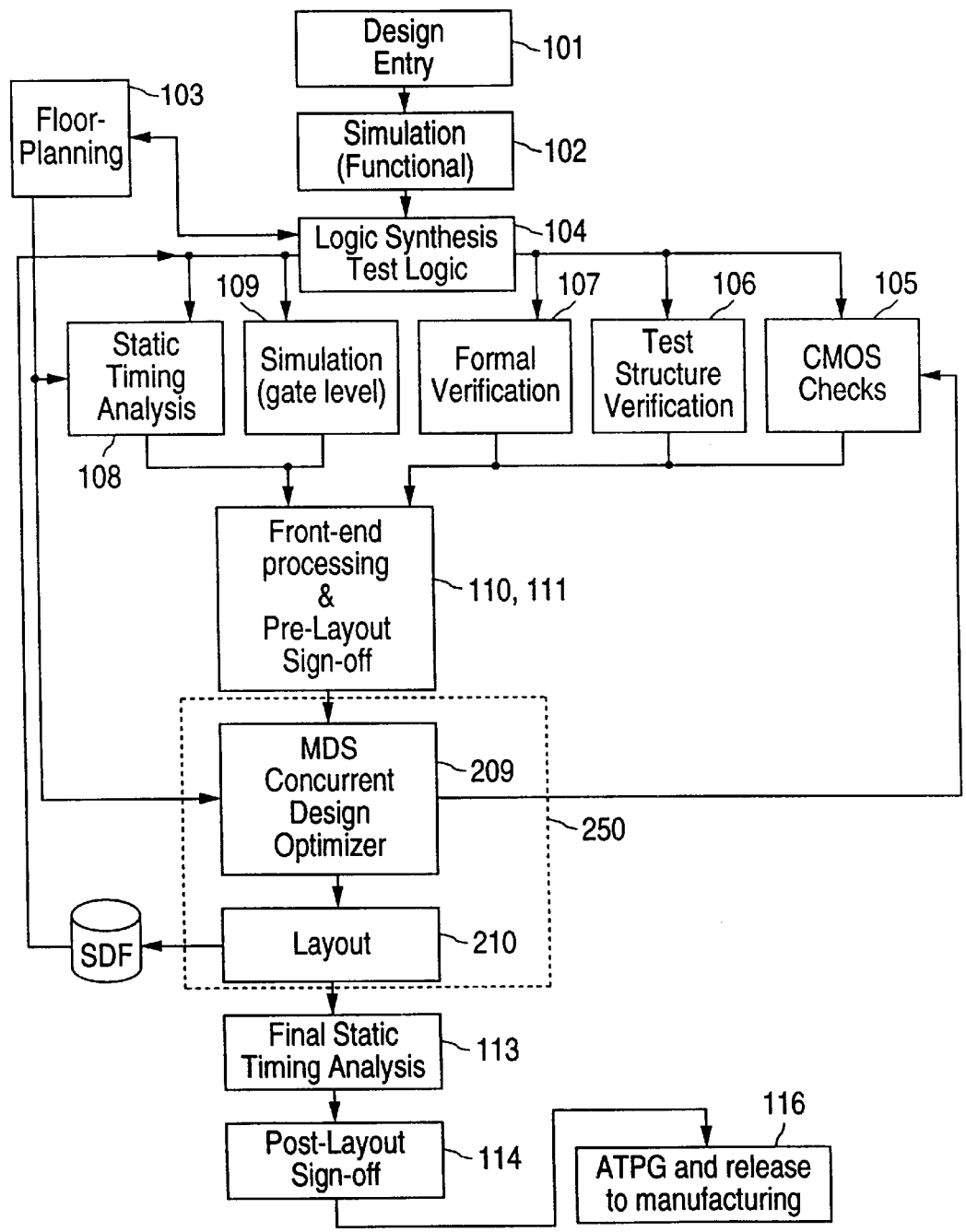
FIG. 2 shows a method 200 for designing an integrated circuit in one embodiment of the present invention.

One embodiment of the present invention is a design method 200 illustrated in FIG. 2. As shown in FIG. 2, method 200 includes design entry step 101, functional simulation step 102, logic synthesis step 104, floor-planning step 103, technology checking step 105, formal verification step 107, test structure verification step 106, timing analysis step 108, gate-level simulation step 109, front-end processing and pre-layout signoff steps 110, 111 substantially in the same conventional manner as those steps of like reference numerals illustrated in FIG. 1 and discussed in the previous section. Method 200, however, synthesizes layout using a novel concurrent design optimization step 209, which performs in parallel placement, logic optimization and routing functions driven by concurrent timing and power analyses. Design optimization step 209, discussed in further detail in the following, provides a layout (generated at layout step 210) which is substantially optimized for power and timing. Accordingly, in method 200, the number of iterations through the optimization cycle of steps 104–111, 209 and 210 is substantially less than corresponding optimization cycle of steps 104–113 of method 100 illustrated in FIG. 1. When the designer is satisfied with the layout design, final timing analysis step 113, post-layout sign-off step 114 and ATPG step 116 can be performed in the conventional manner.

Figure 3:
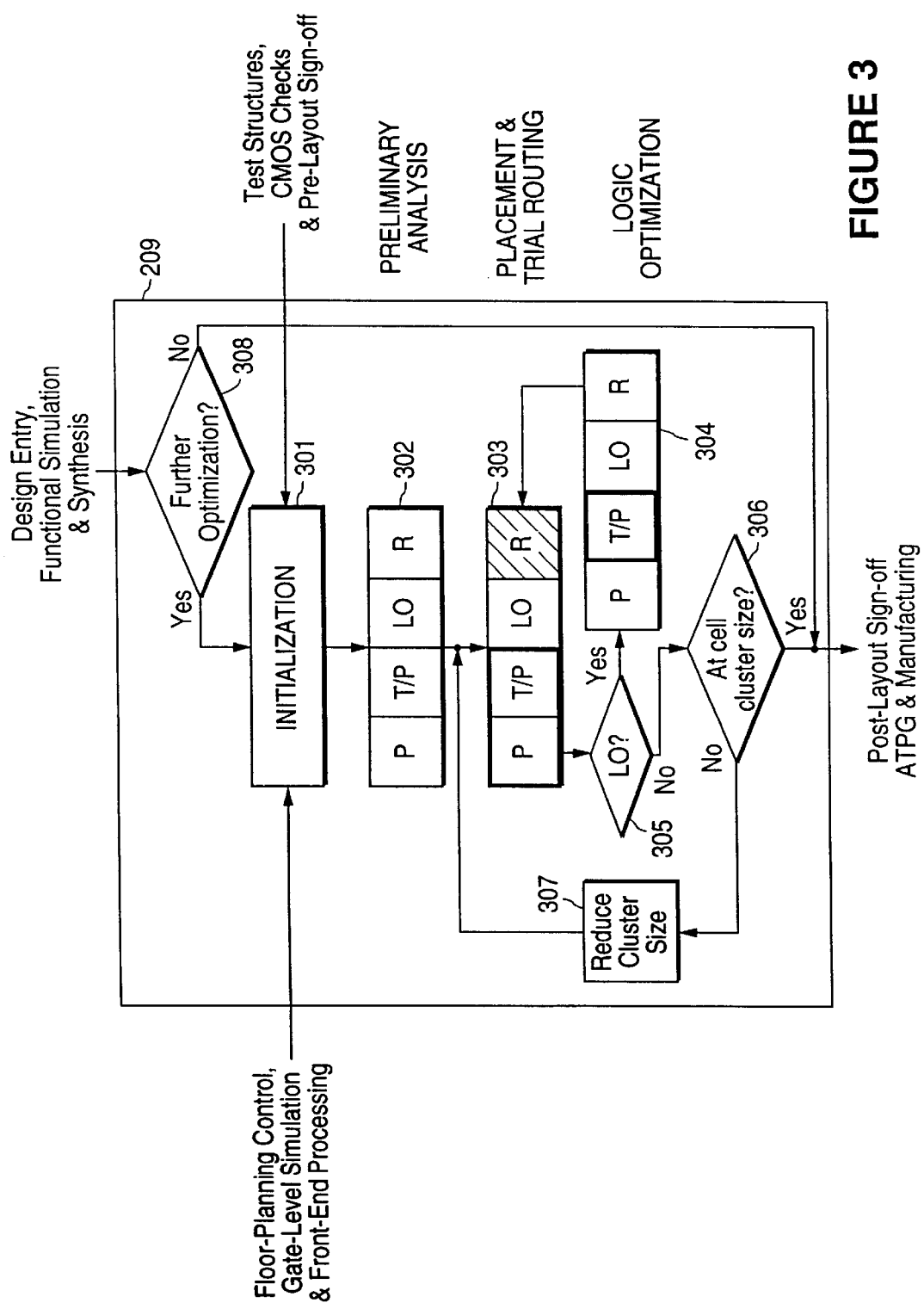
FIG. 3 shows in further detail design optimization step 209 of FIG. 2.
Figure 4:
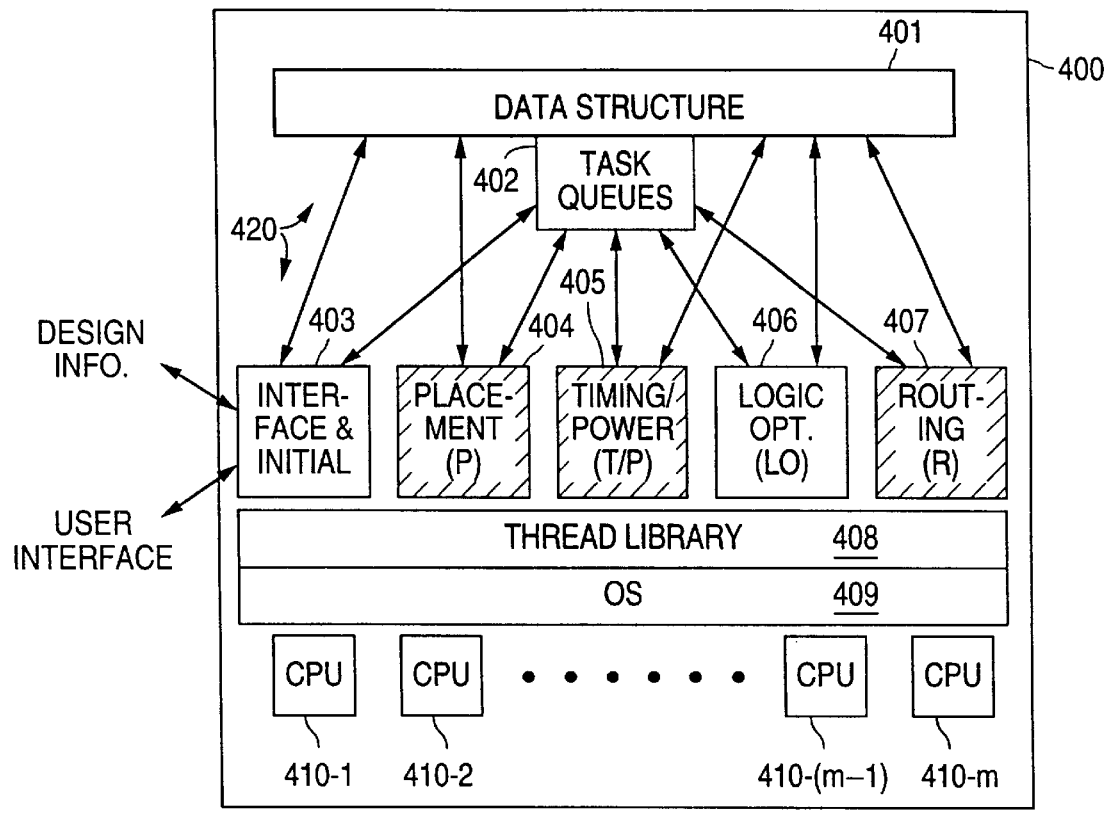
FIG. 4 shows a parallel processing computer system 400, suitable for implementing a concurrent design optimizer of the present invention.

Concurrent design optimization step 209, which is illustrated in further detail in FIG. 3, can be carried out in a parallel processing computer system ("concurrent design optimizer") having an architecture provided, for example, in FIG. 4.

In FIG. 3, a gate-level design, which can be provided in the form of an industry standard "netlist", is received at the beginning of concurrent design optimization step 209. This gate-level design, which results from a logic synthesis step (e.g., logic synthesis step 104) is then examined to determine if further optimization of the design is required. Typically, the designer indicates whether such optimization is required when invoking the concurrent design optimizer. If design constraints have not been met, i.e., further optimization is required, an initialization step (i.e., initialization step 301) is performed.

Initialization step 301 groups the elements of the netlist into clusters. Each cluster is so grouped as to allow highly connected elements to be placed in close proximity. The goal of such clustering is such that circuits within a cluster are tightly coupled and circuits from different clusters are loosely coupled. Proper clustering of the netlist improves performance of the subsequent placement step by reducing the search space.

Upon completing initialization step 301, a preliminary placement and routing estimation step 302 is performed. Initial placement and routing estimation step 302 (a) maps the clusters into an initial set of partitions ("initial placement"), (b) performs an initial timing and power analysis based on the initial placement, (c) optimizes the initial placement according to a given set of cost functions, and (d) provides an initial routing or an initial set of routing estimates. In addition, a logic optimization step can also be carried out to further improve performance. Suitable logic optimization step includes providing alternative implementations of logic circuits, and insertion or deletion of signal buffers. At this level, as clusters are loosely coupled, significant parallelism can be exploited by a parallel processing computer system, such as computer system 400 of FIG. 4, which is discussed in further detail below. In one embodiment, the available space in the layout is divided into regions ("bins"), and placement of each cluster is achieved by associating the cluster with a specific bin.

Having provided an initial placement by initial placement and routing or routing estimate step 302, an iterative process involving an "inner" loop and an "outer" loop is carried out to further refine the design optimization process. Each iteration of the outer-loop reduces the size of each cluster, until the level of individual cells (e.g., logic gates or macrocells) is reached. In addition, each bin can be further partitioned into smaller bins to refine the granularity of the placement.

In the inner-loop, a placement and routing estimate step 303 (a) places the gates in each current cluster into the current set of bins in the physical layout, the current clusters being either the clusters of the initial placement or clusters from the previous outer-loop iteration; (b) providing routing or routing estimates based on the current placement; (c) analyzes timing, routing density and power attributes of this new placement to obtain performance metrics; (d) perform logic optimization on the current placement based on the performance metrics obtained, to obtain an improved gate-level design; and (e) providing an improved set of clusters. As represented by placement and routing or routing estimate step 304, steps (a)–(d) of placement and routing estimate steps 303 can be repeated to provide further placement optimization, given the current cluster size. Placement optimization step (a) can be carried out using a variety of techniques, such as various annealing techniques, or genetic algorithms. Logic optimization step (c) is performed to synthesize variations of the logic circuits within each cluster, based on which further placement optimization are possible. Step 304 is repeated until some performance constraints are met, e.g., the expected performance gain falls below a threshold metric.

At this point, if the current clusters are not reduced to primitives (e.g., a library cell), a cluster size reduction step 307 divides the current clusters into smaller clusters, and initiates the inner-loop placement and routing or routing estimate steps 303 and 304 in the manner described above, until the clusters become primitives. Then, conventional final timing analysis, post-layout sign-off and ATPG steps 113–116 can be performed.

Figure 5A:
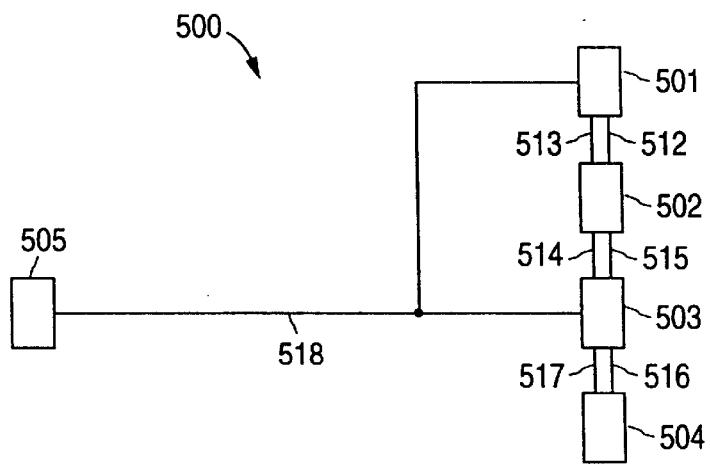
FIG. 5(a) shows circuit 500 including circuit elements 501–505 interconnected by nets 512–517.

Because an integrated circuit layout design created from an initial netlist using the method described above, in which placement, routing or routing estimates and logic optimization are performed at every level of cluster refinement, the resulting integrated circuit is expected to be significantly different in organization from an integrated circuit created from the same initial netlist but refined by conventional partitioning, placement and global routing performed in the manner shown in FIG. 1. For a given gate-level logic netlist, certain optimizations in the layout design attainable using the methods of the present invention are unattainable using conventional serially applied partitioning, placement and global routing methods. FIGS. 5($a$)–5($c$) and FIGS. 6($a$)–6($b$) provide two examples to illustrate the effects of concurrent placement, routing and logic optimization on integrated circuit designed under the present invention.

As shown in FIG. 5($a$), a circuit 500 includes circuit elements 501–505, which are interconnected by nets 512–517. In circuit 500, net 518 represents a portion of a "critical" path (i.e., a signal path in which strict timing constraints must be met) which includes circuit elements 505 and 503. Logic element 501, however, is not part of the critical path. Thus, many optimization techniques would tend to move circuit elements 505 and 503 closer together to reduce the total wire length of net 518, hence reducing the interconnect delay.

Figure 5B:
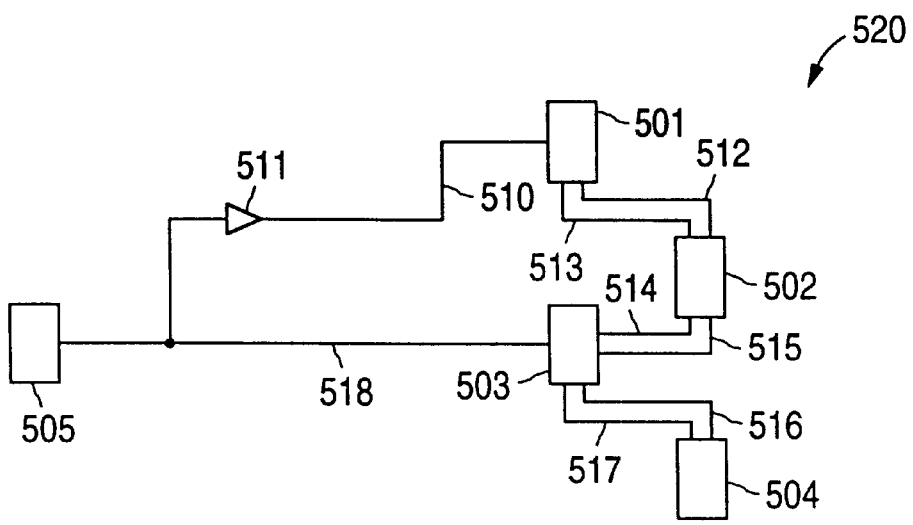
FIG. 5(b) shows circuit 520 after placement, routing and logic optimization steps performed under the prior art.

The prior art technique illustrated by FIG. 1 would provide a circuit implementation such as circuit 530 shown in FIG. 5(b). To reduce the wiring length in net 518, a placement tool would move circuit elements 501, 503 and 505 closer together, as shown in FIG. 5(b). Subsequently, a routing tool provides the wiring of nets 512–517, as shown. However, a subsequent timing analysis would discover that the shorter wire length would still be insufficient to satisfy the strict timing constraints of net 518. Accordingly, an optimization step after the timing analysis would insert buffer 511 between logic elements 505 and 501, thereby reducing the capacitance of net 518 and introducing a new net 510 in this non-critical portion of net 518. However, because logic elements 501 and 503 are moved closer to logic element 501, the interconnect wiring in nets 512–517 amongst logic elements 501–504 are consequently lengthened, thereby incurring a penalty in circuit area and routing congestion.

Figure 5C:
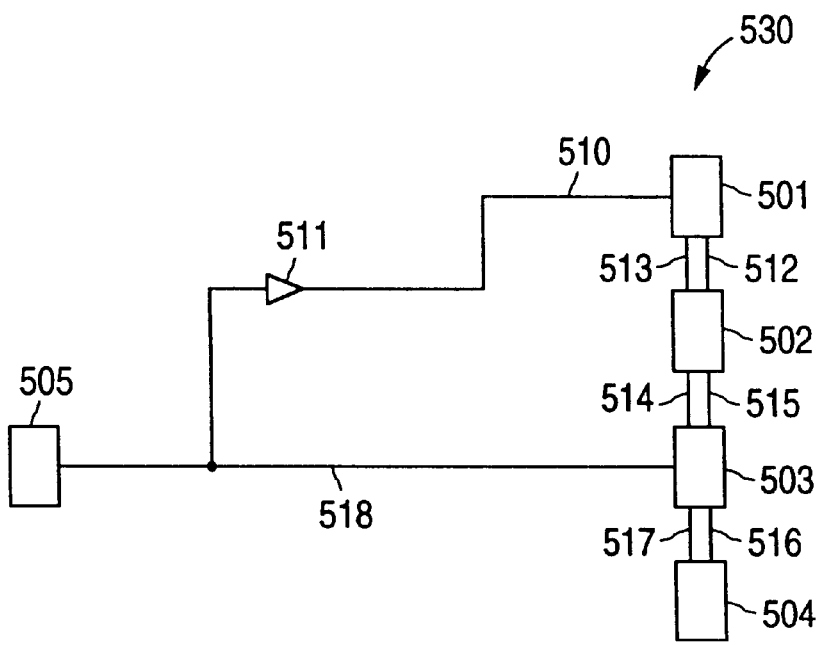
FIG. 5(c) shows circuit 550 after placement, routing and logic optimization steps performed under the present invention.

Because of the iteration in the inner-loop, however, the present invention would provide an implementation such as circuit 530 shown in FIG. 5(c). During iteration in the inner-loop, the logic optimization step in the inner-loop would recognize that inserting buffer 511 would satisfy the timing constraints in net 518, before the placement step in the next iteration in the inner-loop, thus preserving both the initial placement of logic elements 501–504 and the wiring in nets 512–517.

Figure 6A:
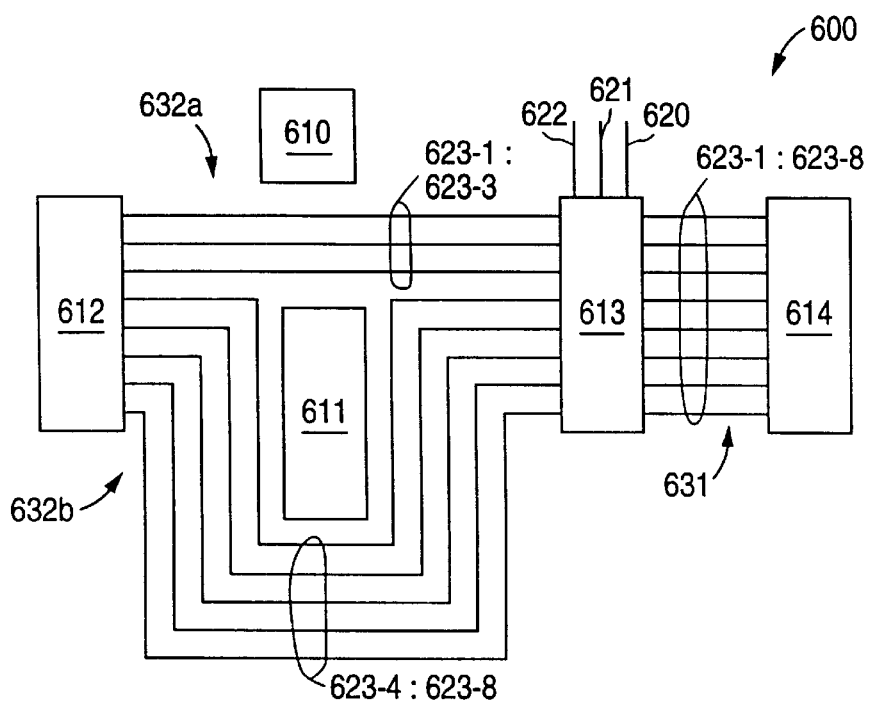
FIG. 6(a) shows circuit 600 placed and routed in accordance with methods in the prior art.
Figure 6B:
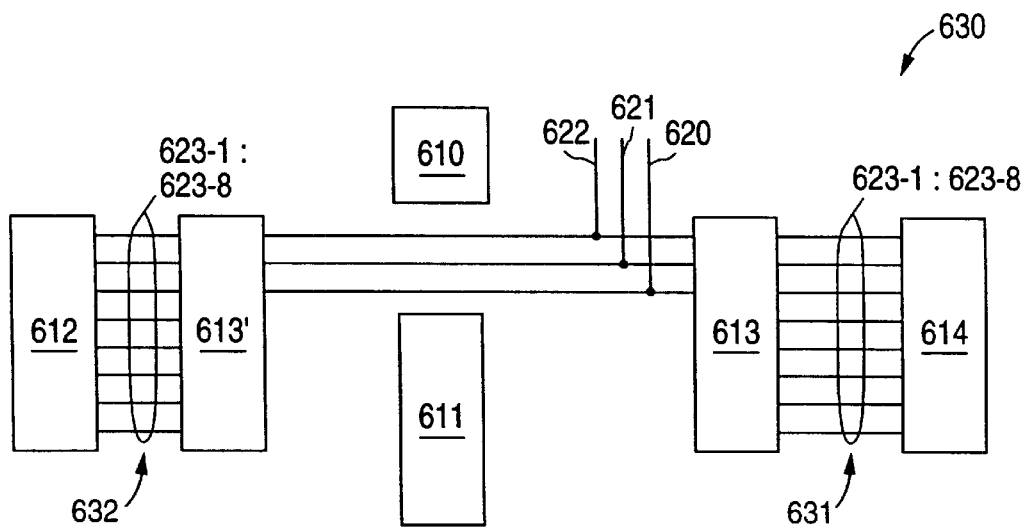
FIG. 6(b) shows circuit 630 placed, routed and logic optimized in accordance with one embodiment of the present invention.

A second example to illustrate the effects of the present invention on integrated circuit design is provided in FIGS. 6(a) and 6(b). FIG. 6(a) shows a circuit 600, which includes circuit elements 610–614. Circuit element 613 includes a decoder which receives encoded signals 620 to 622, and decodes these signals into signals 623-1 to 623-8. Signals 623-1 to 623-8 are provided to circuit elements 612 and 614. Under the prior art placement and routing methods, a placement tool provides placement of circuit elements 610 to 614, as shown. Subsequently, a routing tool provides (a) between decoder 613 and 614, wires 631 for signals 623-1 to 623-8, (b) between decoder 613 and circuit element 612, wires 632a for signals 623-1 to 623-3 in the channel between circuit elements 610 and 611, and (c) between decoder 613 and circuit element 612, wires 623b for signals 623-4 to 623-8 around circuit element 611. As shown in FIG. 6(a), because placement optimization and routing are only loosely coupled, the placement of circuit elements 610 and 611 allows only three of the eight decoded signals 623-1 to 623-8 to be routed in the narrow channel between circuit elements 610 and 611. The remaining decoded signals must be routed around circuit element 611, thus increasing chip area, and causing signal congestion, timing and power dissipation inefficiencies.

In contrast, under the present invention, during iteration in the inner-loop, the placement and logic optimization steps would provide an additional decoder 613', as shown in circuit 630 of FIG. 6(b). Signals 623-1 to 623-8 can thus be provided to circuit element 612 from additional decoder 613'. As shown in FIG. 6(b), relatively short wires 632 and 631 provide signals 623-1 to 623-8 circuit elements 612 and 614, respectively. Further, the relatively narrow channel between circuit elements 610 and 611 is now used to route encoded signals 620 to 622 to decoders 613 and 613'. Clearly, if decoder 613' occupies an area smaller than that occupied by wires 623b, circuit 630 of FIG. 6(b) is more efficient in silicon real estate, timing and power dissipation than circuit 600 of FIG. 6(a). Additional decoder 613' could not have been added under the prior art methods, since there is no room which can be allocated to place an additional decoder.

FIG. 4 shows a parallel processing system 400 suitable for implementing a concurrent design optimizer of the present invention. As shown in FIG. 4, parallel processing computer system 400 includes a shared memory 420 and a large number of central processing units (CPUs) 410-1, 410-2, 410-3, . . . 410-(m−1) to 410-m. Provided in shared memory 420 is an operating system 409 which can be executed on each of CPUs 410-1 to 410-m. A thread library 408 provides the control programs for executing multiple concurrently executed threads on operating system 409. The concurrent design optimizer provides data structure 401, representing the design to be optimized, in shared memory 420. Also residing in shared memory 420 are (a) interface and initialization module 403, representing the programs for interface with the design database and a user interface, (b) placement module 404, representing the programs for placement of clusters and for placement optimization; (c) timing/power analysis module 405, representing programs for incremental timing and power analysis steps, (d) logic optimization module 406, representing programs for optimizing a logic circuit, and (e) routing or routing estimation module 407, representing programs for routing and estimating use of routing resources. Alternatively, each CPU can have its own copy of modules 403–407, residing either in shared memory 420 or in a memory to which the CPU has exclusive access (e.g., a private address space).

The algorithms used in the methods described above (e.g., those used in the placement and routing or routing estimate steps 303 and 304 discussed above in conjunction with method 300 of FIG. 3) can be efficiently executed in parallel. For example, since each of the placement, placement optimization steps, routing and routing estimation, logic optimization, incremental timing and power analysis steps described above operate on at most a few clusters at a time, and since the design includes a large number of groups of clusters, each group involving a small number of clusters can be handled by a different independently executing thread. Each thread can begin execution in any of CPUs 410-1 to 410-m. Communication within the modules executing within a thread, or between modules executing on different threads can be achieved by a task queue 402. For example, upon completion of a placement of gates into the lower level clusters, a placement program of placement module 404 running in a thread can create a task in task queue 402, pointing to a new placement for the thread's assigned clusters in data structure 401. Upon initialization, a program in timing and power analysis module 405 then accesses task queue 402 to find the task left by the previous placement program and proceeds to perform timing and power analysis on the new placement. To assure data integrity and concurrency under such a highly parallel system, a locking mechanism can be provided to prevent accidental write access by multiple threads to the same data structure (e.g., a cluster). Since granularity of such data structure is small, and the number of such data structures is enormous, the probability of concurrent access by multiple threads to the same data object is small. When multiple threads attempts to access the same data object, a simple resolution mechanism which grants access to one thread and queues accesses by the other threads would suffice.

A CPU, such as any of CPUs 410-1 to 410-m, would be configured to run any of the programs in modules 403–407, and would be controlled by an operating system which provides services for creating and executing in a thread using programs in thread library 408. In addition, the CPU would maintain processes which handle reading tasks from and writing tasks to task queue 402, and reading data from and writing data to data structure 401 which includes the design data of the integrated circuit under design. CPUs 410-1 to 410-m can be implemented, for example, by a group of high-performance microprocessors, or a group of engineering design workstations.

FIG. 7 which includes both FIGS. 7(a) and 7(b) consists of a flow diagram of a method for optimizing integrated circuit performance in accordance with one embodiment of the present invention. As shown in FIG. 7, at step 0.1, an input net list (e.g., a logic gate-level net list synthesized from a behavioral description of an integrated circuit or a portion of an integrated circuit) (or a soft macro specification) is received. The input net list can include buffers and repeaters that were added during synthesis in an attempt to optimize performance. At step 0.1, the buffers and repeaters that were added during synthesis can be changed or removed, or buffers can be deleted (e.g., for attenuation purposes).

At step 1, the circuit elements within the net list are clustered according to connectivity into "topological clusters" or "topo-clusters." The input information includes top-down timing constraints for paths or the required operating frequency. In this embodiment, within a topo-cluster, circuit elements are highly connected. By comparison, circuit elements of different topo-clusters are loosely connected. In forming topo-clusters, certain clock nets and certain circuit elements can be preplaced and labeled special to prevent the clustering algorithm to be applied to these special clock nets and circuit elements.

If pad assignments have not been made, then the topo-clusterings consider pads as objects, and the subsequent placement steps place them. If pad assignments have been made, then it is possible that they have been assigned in a way that will adversely impact the subsequent optimizations. Therefore, the topo-clustering algorithm should provide some diagnostics for bad pad assignments.

At step 2, a value "k" is calculated to divide the chip area of the integrated circuit into "bins" (or "quanto-clusters", for "quantized clusters") of predetermined areas. The value k is calculated based on the total available chip area and the expected RC delay characteristics of the interconnect technology. Typically, the RC delay characteristics depend on the resistance and the capacitance of the interconnect and the frequency of operation. The value "k" is a function of the minimum distance for which the propagation delay of a buffer is less than the RC delay of an interconnect wire of minimum width, and the maximum distance for which RC signal attenuation is acceptable.

The present invention also inserts a buffer (e.g., an inverter pair) or repeater when insertion of such a buffer (a) provides both additional drive to reduce the propagation delay to a far away load, and shielding to reduce the delay to a nearby load; or (b) reduces the delay to a nearby load on a critical path. The inserted buffer shields the nearby load from the capacitive load of the interconnect to a far away load. Buffer insertion based on these criteria can be performed while delay or slack graphs are calculated (e.g., at each of steps 4, 10 and 16, discussed below).

With the partition size established based on these conservative length estimates, a large percentage of inter-bin wires will include at least one inverter pair, and the eventual increase in gate area due to inverter-pair insertion can be estimated. Because lower bound estimate on lengths is used, not all of the inter-bin wires will include inverter pairs. The inter-bin wire pins are marked (at step 7, which is discussed below), and wavecalc (at step 5, which is discussed below) considers buffer insertion for all such nets. For subsequent optimization steps, this lower bound distance indicates that below this bin-to-bin center spacing, no wires between adjacent bins will require a repeater for attenuation purposes or a buffer for delay improvement purposes.

Because shielding of near driver fanouts generally improves with buffer insertion, determining when to insert shielding buffers requires global slack information. However, it may be wise to initially insert inverter pairs for shielding also, to allow the design to spread out. Therefore, at this initial level of partitioning, step 7 identifies and marks pins where a shielding buffer may be warranted at step 5. When marked as a shielding buffer, wavecalc will not have sufficient information to judge whether or not the shielding buffer is an improvement, so wavecalc inserts buffers for these specially marked pins if the interconnect capacitance calculations indicate that the near driver fanouts are improved. Because some of the gates will become closer together during subsequent levels of partitioning, a significant percentage of the inter-bin connections at a high level of partitioning can decrease to shorter wiring lengths during subsequent stages of partitioning. Because some of these inverter pairs will be removed during these subsequent stages, it is desirable for these inverter pairs to remain virtual inverter pairs (VIPs) for as long as possible, as discussed below.

With the value "k" calculated at step 2, the chip area can be divided into a 2-dimensional configuration of k bins or quanto-clusters. At step 3, each topo-cluster obtained at step 1 is mapped into one or more quanto-clusters. The circuit elements of a quanto-cluster are mapped into a single center point within the quanto-cluster. In one embodiment, for each topo-cluster, circuit elements of the topo-cluster are assigned to a quanto-cluster until the quanto-cluster reaches its maximum gate capacity and the remaining unassigned circuit elements of the topo-cluster are then assigned to the next available adjacent quanto-cluster. This procedure repeats until all circuit elements of all topo-clusters are assigned.

The topo-clusters are mapped to the partition grid via a thorough optimization approach, such as annealing. An initial 2D ordering of "what's next to what" is used to seed the annealing. Topo-clusters that are larger than a k-partition are further partitioned as part of the mapping process. It is assumed that some error will be incurred in this mapping. However, it is expected that the subsequent k-level GBFM (at step 5, which is discussed below) which follows will address the global aspects of the clustering. Once an initial placement is available, the top-layer clk tree/mesh design is instantiated. With user input, a clk tree/mesh style is selected. The topo-clustering placement is then used to estimate local bin capacitances for latches in order to insert buffers and size the clock tree wiring.

In addition, in this embodiment, where a connection exists between two circuits elements mapped into two different quanto-clusters, a "virtual buffer" is inserted between the circuit elements. Because the circuit elements could eventually be placed within a distance of each other over which buffering is not necessary, at this stage of processing, the virtual buffer is not actualized by a modification to the input net list. Rather, the virtual buffer is kept on a "virtual list" until evaluation at a later step (step 9, which is described below) indicates that the virtual buffer should be actualized and included into the net list. However, for timing purpose, each virtual buffer is treated as if it is actually included into the net list. In this embodiment, a virtual buffer can be implemented by a pair of series-connected inverters, referred to as a virtual inverter pair or "VIP".

At step 4, having mapped all circuit elements into quanto-clusters, delays for each net are calculated. Because circuit elements within a quanto-cluster are placed at the center point, a statistical estimate of delay is provided for each net within a quanto-cluster. Such a statistical estimate of delay can be provided, for example, based on the fan-out at a driver of the net. A delay based on an estimate of the resistance and capacitance in a net ("RC calculations") can be provided for a net between circuit elements of different quanto-clusters. If a net has a non-negligible portion of delay within a quanto-cluster and a non-negligible portion of delay between clusters, then an estimate based on both the statistical estimate of delay and the RC calculations can be provided.

In this embodiment, the expected performance at each net is represented by a "slack graph" (i.e., the slack at each net is represented by the time difference between the arrival time and the required time of a signal on the net).

Slack allocation schemes for performance-driven placement (see, e.g., W. Luk, A Fast Physical Constraint Generator for Timing Driven Layout, Proc. of the Design Automation Conference, June 1991) can become trapped in local minima, therefore the capabilities of a fully incremental timing analysis are provided. But it is recognized that updating the slack graphs at each placement iteration can be overly costly and could limit the use of parallel processing strategies. Therefore, a scheme is provided for lazy updates of the slack graph. Specifically, all delay changes among combinational sections are monitored, and once they exceed a threshold the slack graph are incrementally updated, as discussed below.

Inequality timing constraints, across blocks of combinational logic can be input. It is assumed that relative clocking speeds and clock phase widths have been established at the synthesis level and are passed as constraints to the timing level. In one embodiment, the timing in terms of adjusting the clock signals is not optimized.

The propagation delay of any logic gate can be estimated by conventional techniques, such as using Thevenin equivalent or effective load ($C_{eff}$) models. However, the $C_{eff}$ calculation can be approximate and use only one $C_{eff}$ iteration. For sizing, the gate models are also be characterized as a function of gate width.

Approximating the gate and interconnect delay to each fanout pin on a net during placement optimization involves an interconnect (net topology) model. A possible choice for this model would be a Steiner tree approximation, however, for efficiency the use of various spanning tree models and even comb tree models can be employed.

For nets that are non-critical, the optimal topology model is unnecessary, and a simple bounding box model is used to estimate congestion while a delay primitive model is used to estimate delays.

Because net criticality is unknown initially, all nets are assumed to be non-critical initially, and the simple net primitive model is used to calculate the delays. This model produces a pessimistic delay approximation, so that path lengths are not grossly underestimated in this step. Using these delay estimates, the nets with negative or small positive slacks are identified, and during the course of subsequent GBFM and LO (Logic Optimization) calls to wavecalc, the optimal topology model is used to estimate the delays and congestions for these identified nets.

The net topology approximation can also consider multiple wire width assignments for segments as a type of approximate layer assignment. Congestion of the inter-bin connections at the higher levels of partitioning reflects congestion of the upper layers of metal (which are thicker and wider).

Another case to consider is that when the gate delay is insensitive to net topology (e.g., a local net where C-load is dominated by pin-load capacitances, and metal resistance is negligible) even if the net is critical, the delay is estimated using a bounding box estimation of the metal capacitance.

The gate delays can be classified into three categories, and three models. For nets for which the gate delay is insensitive to net topology, the net can be treated as an equipotential surface, metal resistance is not considered, and the load capacitance is estimated by the pin and half-perimeter capacitance. When the metal resistance is a factor and the net is critical, the gate and interconnect delays are calculated in terms of the first four moments from the optimal net topology using an implementation of the PRIMO/h-Gamma algorithms, which are discussed in R. Kay and L. Pileggi, PRIMO: Probability Interpretation of Moments for Delay Calculation, Proc. of the Design Automation Conference, June 1998 and T. Lin, E. Acar and L. Pileggi, h-gamma: An RC Delay Metric Based on a Gamma Distribution Approximation of the Homogeneous Response, Submitted to the International Conference on Computer-aided Design, April 1998. Finally, when the metal resistance matters, but the net is not critical, the delay is estimated using a net primitive model.

The moments of the optimal net topology or the primitive net model is calculated using an implementation of RICE (see, e.g., C. Ratzlaff, L. Pileggi, RICE: Rapid Interconnect Circuit Evaluator, IEEE Trans. on Computer-Aided Design, June 1994). The waveform calculator is capable of modeling detailed electrical effects such as current densities (for electromigration constraints) in terms of explicit expressions which are functions of the circuit parameters.

Statistical, or fanout based delay estimates are required, because all gates within a bin are considered to be in one, zero area, location. This fanout based statistical delay model should be based on technology and design history to improve the accuracy. Fanout based delay models are known to be inaccurate. However, because inverter pairs to the far away fanouts are added, the statistical delay models should be much more accurate than for the general case, because the net lengths are bounded by the size of the partitions. Moreover, as the partition sizes are decreased, the statistical model accuracy should increase. A combination of fanout model and inter-bin interconnection and loading can also be used (e.g., a hybrid mode). The estimated capacitance for the intra-bin statistical model appears as a load capacitance on the inter-bin net model.

With k-bin partitioning, where k is based on the minimum distance for which a signal traveling from the center of one partition to the center of another would most likely warrant the insertion of an inverter pair, most interbin wires are assumed to be connected via at least one VIP for gate counting purposes at this highest level of partitioning. However, VIPs are instantiated during the inner loop (steps 5 through 7), as discussed below.

In wavecalc, VIPs are inserted for those pins that are marked at step 7, which indicate where such insertion may be warranted. When a pin is marked, wavecalc in GBFM calculates the waveforms assuming that these inverters exist. Based on this analysis, the inverters are potentially inserted virtually. However, the net list is not changed. The inverter pairs that are inserted at this initial level of partitioning remain virtual throughout the inner loop, and the net list is not changed. The VIPs are only considered in the Waveform Calculator and a percentage of their area is used to measure gate cost per bin. It is in the outer loop during GR (steps 9 through 13) that "some" of the VIPs are physically placed, and included in the net list, as described below.

A list is maintained of all of the input pins, which are driven by VIPs. This list is utilized at step 9 of the outer loop where their corresponding nets are globally routed, and some of the inverter pairs are physically inserted and sized as part of a logic optimization step. It is at this stage that the net list is changed.

The decision as to whether or not to change the virtual status of a VIP in the outer loop is based on the following two factors: 1) is it likely that we will have to undo this net list change, and 2) is it necessary to place the inverter pair to get an accurate measure of the net routing and topology.

At this initial stage of partitioning (step 4), all wires in adjacent bins are assumed to be separated by the bin-center to bin-center distance, thereby requiring an inverter pair in most cases. But clearly, only a percentage of these wires have lengths greater than or equal to this distance. Therefore, a certain percentage of these wires will not require an inverter pair. However, because these wires will in most cases span only neighboring bins, maintaining the virtual status for these inverter pairs makes them trivial to remove.

Multiple far away loads can also be accommodated. For distance loads, which reside in the same bin, they will share a VIP for the inter-bin connection. For multiple faraway loads in multiple bins, each connection can include a separate VIP for delay calculation purposes, which amounts to a star net topology assumption.

The initial sizes of the inverter pairs are determined initially by the rules chosen for specifying repeater and shielding buffer wire lengths. Then, during waveform calculation, the sizing can be chosen based on simple inverter location and sizing rules following the insertion of inverters in an RC ladder (which is the driver to pin net model primitive).

Using slack information, at step 7 this embodiment iterates with partitioning to decide whether or not to insert an inverter pair for shielding purposes. Some flags can be set in wavecalc to highlight those nets that are prime candidates for shielding buffers.

At step 5, a placement algorithm provides placement of circuit elements based on minimizing a cost function. In this embodiment, the cost function includes congestion, gate area, total wiring, power, and delay components. One example of a suitable placement algorithm is a geometrically bounded placement algorithm (known as the "GBFM" algorithm), which is based upon the Fidduccia-Matheyses algorithm, which is well known in the art. Under the GBFM algorithm, adjacent quanto-clusters can be exchanged, and a gate within a quanto-cluster can be moved to an adjacent quanto-cluster.

Co-filed and co-assigned U.S. patent applications, entitled "Placement Method For Integrated Circuit Design Using Topo-Clustering", Ser. No. 09/097,107, "A Method For Logic Optimization For Improving Timing And Congestion During Placement in Digital Integrated Circuit Design", Ser. No. 09/097,076, "A Method For Accurate And Efficient Updates of Timing Information During Logic Synthesis, Placement And Routing For Digital Integrated Circuit Design", Ser. No. 09/094,542, are hereby incorporated by reference in their entirety.

According to the present invention, inter-bin interconnect wires associated with a gate are concurrently placed when the gate is placed. However, instead of providing exact routing after the gate is placed, the present invention provides a "smear" representation, which represents a collection of optimal possible routes of less than a predetermined cost. One example of such a "smear" representation is a "bounding box" representation, which provides a wiring density over an area covering a number of possible routes of less than the predetermined cost. Co-filed and co-assigned U.S. patent application, entitled "System and Method for Placement of Gates and Associated Wiring", is hereby incorporated by reference in its entirety.

Because the wiring density is determined without regard to other "wires" (i.e., smeared wires) associated with other gates, the present invention provides a congestion measure that is based on the preferable position of the wire, rather than the constrained maximized route attached to a particular placement of the gate or gates to which the wire is associated. For a given location, the local wiring density, and hence congestion, is the sum of all smears at the location. During placement, a gate and nets associated with the gate can be moved to reduce the local wiring density. A new smear is then calculated for each net at the new gate location. If the net has a large positive slack (i.e., the arrival time is much earlier than the required time), then higher delay routes can be included in the smear. Conversely, where the placement of additional smears increases the congestion at a particular location, the cost estimate (e.g., the slack) on each net related to the smears at the location should be updated. In the present embodiment, an update to a slack is provided after the cost difference exceeds a predetermined threshold.

In the present embodiment, placement and routing are refined through iterations of an inner loop and an outer loop. The inner loop includes steps 5–8, and the outer loop includes steps 5–7 and 9–16 in FIG. 1. After every cycle over the outer loop, the bins of the previous cycle are further partitioned (at step 15, which is discussed below) recursively into smaller bins, with the circuit elements of a bin in a previous cycle being redistributed into the smaller bins in the current cycle. As discussed below, in every cycle through the inner loop, logic optimization techniques (e.g., gate splitting) are applied (at step 7, which is discussed below). Such logic optimization techniques typically modify the input net list with the intention that the resulting net list can be placed and routed at a lower cost. In the present embodiment, if the logic optimization does not result in relief to congestion or result in the gates involved in the optimization being moved, then the logic optimization is reversed (uncloned) at step 6.

In particular, the placement can be based on quadrisection (see, e.g., P. Suaris and G. Kedem, Quadrisection: A New Approach to Standard Cell Layout, In Proc. of ICCAD, November 1987; P. Suaris and G. Kedem, A Quadrisection-Based Combined Place and Route Scheme for Standard Cells, IEEE Trans. on Computer-Aided Design, vol. 8, no. 3, pp. 234–244, March 1989), applied in a recursive manner until all of the partitions are small enough that a final cleanup phase of detailed placement can be applied (at step 17). Overlapping and cycling (see, e.g., D. J-H. Huang and A. B. Kahng, Partitioning-Based Standard Cell Global Placement with an Exact Objective, In Proc. of the International Symposium on Physical Design, April 1997) is necessary during partitioning to avoid local minima and allow gates to migrate across several partitions if necessary. In one embodiment, GBFM can perform geometrically bounded partitioning in place of simple overlapping.

The quadrisection placement minimizes congestion. Bounding box "smear" type congestion measures for the inter-bin wires can be used for the non-critical nets as outlined above. More accurate localized smears based on the optimal net topology can used for the critical nets. It is anticipated that localized smearing will only be necessary for the 2- and 3-pin versions of optimal nets. Nets with 4 or more pins will not easily be smeared, nor is it necessary for them to be smeared based on the objectives of measuring congestion of critical nets. For example, assume that congestion is based on a smear over what will be the eventual routing, without considering the congestion that is already in place there. For multi-pin critical nets, the global router will deviate only slightly, if at all, from the optimal net topology (at step 9).

Modeling, particularly the critical nets, in this way, yields a congestion measure based on where wires "should go", rather than where the wires would have to go if this was the final placement. In contrast to the typical approach to performance driven placement, the approach of this embodiment is toward placing the wires (in a smear sense) and the gates concurrently, then focusing the optimization on lowering the congestion where it is problematic.

The congestion measure also includes the intra-cluster wiring area and congestion. This is approximated via some scheme similar to a bi-section partitioning within the cluster in both horizontal and vertical directions. Minimizing the number of inter-bin wires can be insufficient, if the objective is to synthesize and place the design so that congestion is minimized everywhere, including inside of partitions. Moreover, for a wiring bound design, the bin areas will be constrained by the total wiring contained within them, along with the gate areas.

The overall cost is a function of, for example, congestion, gate area, total wiring, power, and delay. Because the delays and wiring area are calculated based on the net topology that reflects where the wires would go for a good delay, the cost function can include scaling of the congestion's by the slacks. For example, if the local congestion measure is determined based on where the wire wants to go for a good delay, but there is significant positive slack, then this congestion estimate is smeared out further to reflect that routing this net in a sub-optimal performance manner will not impact the overall design optimality.

Performance prediction is based on a waveform calculation for the preferred (from a delay perspective) set of net topologies (routings). The localized wiring areas are based on the same set of net topologies. The waveform calculations also consider wire-sizing assignments based (in part) on net lengths, because making decisions regarding delays and VIP insertion is otherwise erroneous. For this reason the congestion measures may have to consider wiring congestion per wire width (layer), but in the least must consider the increased wiring area associated with wider wires. Because layer assignment, hence wire size, depends on routing distance, GR during the early stages of partitioning will give a clear indication of the potential congestion problems for the global wires on the upper layers of routing.

Tuning of the congestion smearing can be required during execution. Steps 9–12 represent a global route (GR) at the completion of each level of partitioning and act as a check on the timing/congestion predictions. It is also at this stage of global routing that the impact of coupling as it impacts the delays and signal integrity is considered. If some really congested areas and timing violations are identified following the GR check, the problematic bins are scaled accordingly and the optimization loop is re-entered (at steps 12–13). The next level of quadrisection is proceeded to only when GR is feasible at each level of partitioning.

The good-performance net topology can be constructed such that it passes directly through an area that is completely blocked by a megacell or dense clock/bus wiring. If the net has a lot of positive slack, then it can be smeared such that it can remain there. But if the net is critical, then the cost function will place a very high cost on this placement such that it will be moved elsewhere. In this way, blockages can be naturally handled using the net smear model.

During waveform calculation, inverter pairs are virtually inserted for those pins that are marked as likely candidates for such insertion. This marking occurs either: 1) for all interbin wires for k-level of partitioning, or 2) in box 7 as part of electrical optimization to alleviate congestion/timing constraints. A list is maintained of all of the pins which are candidates for VIPs, and wavecal creates a list of all pins for which VIPs were assumed in the delay calculations. Markings for potential locations of VIPs are identified as either: 1) delay/attenuation repeaters, or 2) shielding buffers. For case 1), wavecalc inserts the VIPs when the attenuation limits require it, or when the delay is improved over the unbuffered case, or both. For case 2), the shielding VIPs are inserted as long as the delays to the near-driver loads are improved, which is simply based on whether or not the total load on the original driver is improved by the addition of this shielding buffer (which depends on the locations and possible placement moves for the far away loads).

More complex logic optimization steps can also be desirable to relieve congestion, but they are not attempted within the waveform calculator, because they rely on global slack information. Instead, once a level of partitioning completes, some logic optimization is performed at step 7 in terms of the approximate net topology models. An example of an LO move to relieve congestion is gate splitting. The net list is changed to split the gate, then the loop returns to GBFM to see if the partitioning moves can take advantage of the net list change to improve congestion. If GBFM moves the split gates, then the change is made permanent. If congestion is not changed by the splitting, the LO move is uncloned in the subsequent step 6.

Importantly, with regard to all inverter pair insertions and logic optimizations, the area of the partition is determined by the gates and associated routing that lies in that partition. Therefore, the global convergence is not altered by any logic optimizations, which: 1) remains within the area constraints of all partitions, and 2) maintains the timing constraints within and across a partition in terms of the statistical delay models. Moreover, if as expected, the partition sizes are dictated by congestion, then more gates can be added during the logic optimization. However, it is important to note that for this reason the logic optimization should also consider (smeared) congestion as part of its cost function. As the partitions become smaller and the placement changes become more localized, there will be less opportunity to change the logic within a partition due to congestion and timing constraints. However, the need for logic changes will likely decrease as the partitions become smaller and the design begins to converge.

The waveform calculations are used to update the delay edges on the slack graph, however, the slacks are not updated with each delay edge change. Instead, a lazy update scheme is used so that GBFM is not overly burdened by the time cost function, and so that a parallel processing strategy can be more readily applied. During GBFM, however, the delay changes may reach the threshold point which forces an update of the slack graph. Prior to exiting step 5, a slack graph update is performed prior to beginning the logic optimization steps.

At step 7, logic optimizations, such as gate sizing, pin assignment, gate splitting, cloning, buffer insertion, sizing, and replication, are performed on the net list. Co-filed and co-assigned U.S. patent application, entitled "System and Method for Concurrent Buffer Insertion and Placement of Logic Gates", Ser. No. 09/096,810, is hereby incorporated by reference in its entirety.

At step 8, if the previous logic optimization step results in a change to the net list, then another iteration of GBFM is carried out. Otherwise, a performance-driven global router is called at step 9 to verify that the smeared wiring can result in actual routes meeting timing estimates, to provide actual routing for signal paths involving long wires, to actualize some VIPs into buffers included in the net list and to remove some VIPs.

In steps 1 through 8, congestion is minimized based on predictable-interconnect models, which represented the best-performance wiring placements. If the delay predictions were reasonably accurate, and congestion was properly minimized, global routing should easily complete. These estimates included that congestion was scaled by slack in the cost function to "roughly" reflect areas where the global router may have to exploit positive slack.

Due to the uncertainty of these congestion estimates, however, an actual global routing is performed as a sanity check. Only those nets for which global routing within the predictable routing smear was not possible should cause timing violations to appear at step 10. These timing violations will be used to identify those bins, which are overly congested and require more routing capacity than was anticipated. These bin capacities are scaled (at step 12), and the inner most loop optimizations are repeated (at step 13) at the same level of partitioning.

For those nets that are marked and include the insertion of shielding buffers, smart topology selection is performed so that the net is designed to accept the required post-routing shielding buffer insertion. For example, a Steiner tree may be optimal from a wiring standpoint, but something closer to a star topology may be required when certain pins are being separated for shielding purposes.

To actually insert inverter pairs into the net list and locate them in bins would be crudely specifying a global routing for long and complex nets. Therefore, this GR/LO step places virtual repeaters only when the net is so long, or so complex, that not doing so would result in too much timing and congestion ambiguity.

For example, VIPs between adjacent bins do not have to be placed in the net list. Moreover, as the partitioning continues, a large portion of these nets will become shorter such that the VIPs are removed. Conversely, long nets that span several bins will be inserted in the net list, and physically sized and inserted in the proper bins as part of logic optimization in this box. Upon completion of a GR for the net, a dynamic programming algorithm based on (see, e.g., L. P. P. P. van Ginneken, Buffer Placement in Distributed RC-Tree Networks for Minimal Elmore Delay, ISCAS 1990), but using a more accurate delay model, is used to size and locate the inverters along the net.

A majority of VIP connections that span multiple bins will likely not become short enough to warrant VIP removal. Therefore, changing the net list and removing their virtual nature should not be a problem. Additionally, inserting these inverter pairs in the net list will allow the design to properly evolve. As the partitioning continues to lower levels, more of the inserted inverters will be placed, and the global routings will begin to solidify.

At step 10, the delays and slack graphs of the net list are recomputed in substantially the same manner as described above with respect to step 4, except that the global routes are used to specify actual nets, and wavecalc or is used to calculate the delays of these nets. Also in contrast to step 4, min and max delays are calculated, because approximate timing windows are used for coupling assessment.

At step 11, "coupling assessment" is performed. Coupling assessment in the present embodiment is carried out by identifying interconnect portions (e.g., buses) that have similar temporal activities and travel significant distances along each other, and adjusting the delays using a model that captures the cross-coupling between these interconnect portions.

Based on some notion of what wires travel long distances in the same space as other wires, and the corresponding temporal activity from step 10, the nets for which coupling may have a significant impact on timing are identified. This is an approximate assessment. The min/max switching window from timing analysis is not a bounding window, because coupling has not been considered. Moreover, the switching information in the slack graph is stored only for gate input pins. With gate delay information, gate output pin delays are also available, but timing windows at interconnect intermediate nodes are not saved. Based on the delay model uncertainty, more accurate coupling information may not be warranted at this stage and may only be required during detailed routing.

The interconnect intermediate node information can be easily added by inserting checkpoint nodes along long interconnect segments and storing them as part of the timing graph. The min/max absolute bounds would require us to make nominal delay approximations and worst case approximations (by scaling all of the coupling C's by a factor of 2–3, for example) during every waveform calculation.

Based on the wires that have similar temporal activity and travel significant distances together, the congestions in these bins is reduced so that the router will have more options to meet timing constraints, which includes the ability to space wires if necessary.

Congestion reduction is accomplished by the bin scaling at step 12, and the return to the optimization loop at step 13. If timing constraints are unchanged by coupling, for example, if the corresponding nets are non-critical, then the corresponding bin areas are not scaled.

Coupling assessment at the early stages of partitioning is critical, because it is the long wires that travel together that are the most problematic (e.g. buses). A coupling distance factor can be generated based on technology information. As the number of inter-bin wires increases toward the lower levels of partitioning, couplings to neighboring wires become a smaller percentage of the total net wiring, and therefore, coupling-assessment is less critical.

At step 12, "bin scaling" is performed. Bin scaling identifies interconnect portions for which timing violations are detected at step 9 or excessive coupling is detected at step 11. Bin scaling adjusts congestion (e.g., wiring density) in the nets in which the timing violations occur, so that, in the next cycle of the inner loop, the GBFM algorithm (at step 5, which is discussed above) can operate on these nets first, guided by their adjusted congestion measures. In particular, timing violations on nets due to unanticipated congestion that is uncovered during GR, or coupling that is discovered at step 11 are identified, along with the bins in which they reside. In order to return to the inner most loop to correct these problems, these timing constraint violations are translated into new bin area capacities. The bins in which the violating nets appear are scaled down in capacity, thereby penalizing their congestion measure. Then, upon re-entering the innermost loop, these congestion violations represent the initial primary targets.

At step 13, if significant bin scaling was performed at step 12, then additional iterations over the inner loop (from step 5) can be carried out to further provide placement and routing at the current level of partition.

At step 14, if the current quanto-cluster size is larger than a predetermined size (e.g., the gate/cell is a lower bound on the partition size), then at step 15, each current bin partition is partitioned into four equal bins (e.g., using a random processing into four quadrants). Circuit elements of the current bins are randomly remapped into the new bins. Updates to delay and slack graphs are then carried out at step 16, in substantially the same manner as discussed above with respect to steps 4 and 10. The inner loop is then reentered at step 5, as discussed above.

Otherwise, (i.e., the current quanto-cluster is less than the predetermined value) no further partitioning takes place. Instead, at step 17, a detailed placement algorithm, such as conventional cool-annealing cycles, is used to provide final placement of circuit elements of each quanto-cluster. At step 18, a global router is invoked to perform final routing (e.g., detailed routing with coupling noise avoidance).

Although particular embodiments of the present invention have been shown and described, it will be obvious to those skilled in the art that changes and modifications can be made without departing from the present invention in its broader aspects. For example, the present invention is applicable not only to the design of logic circuits with conventional signaling using conventional interconnects, but is also applicable to the design of other circuit technologies, such as high speed mixed mode signals on RF transmission lines or circuits using copper interconnect. The present invention is also applicable to integrated systems design such as the design of a micromachine that includes electronic circuitry. Accordingly, the appended claims are to encompass within their scope all such changes and modifications that fall within the true scope of the present invention.

What is claimed is:

1. A method for design optimization, comprising the steps of:
   placing circuit elements of a design;
   providing routing or routing estimates for said design; and
   performing logic optimization on said design, said steps of placing, providing and performing logic optimization are performed concurrently for at least a portion of time,
   wherein one of said steps of placing, providing and performing logic optimization is performed on one portion of said design while another of said steps of placing, providing and performing logic optimization is performed on another portion of said design.

2. A method according to claim 1, wherein:
   said step of placing is performed on a first portion of said design while said step of providing is performed on a second portion of said design and while said step of performing logic optimization is performed on a third portion of said design.

3. A method according to claim 1, further comprising the step of:
   performing a timing analysis and a power analysis on said design concurrently, for at least a portion of time, with said steps of placing, providing and performing logic optimization.

4. A method according to claim 1, further comprising the steps of:
   dividing elements of said design into clusters;
   performing an initial placement and routing estimation of said design prior to said steps of placing, providing and performing logic optimization; and
   performing an inner loop and an outer loop, said inner loop includes performing said steps of placing, providing and performing logic optimization on a current set of clusters, said outer loop includes reducing cluster size and performing said inner loop on said reduced clusters until said cluster size is at a predefined level.

5. A method according to claim 1, further comprising the step of:
   performing a timing analysis on said design concurrently, for at least a portion of time, with said steps of placing, providing and performing logic optimization.

6. A method according to claim 1, further comprising the step of:
   performing a power analysis on said design concurrently, for at least a portion of time, with said steps of placing, providing and performing logic optimization.

7. A method according to claim 1, wherein:
   said steps of placing, providing and performing logic optimization are performed by parallel processors.

8. A method according to claim 1, wherein:
   said step of placing is performed by a first parallel processor while said step of providing is performed by a second parallel processor and while said step of performing logic optimization is performed by a third parallel processor.

9. A method according to claim 8, wherein:
   said step of placing is performed on a first set of one or more clusters of elements of said design while said step of providing is performed on a second set of one or more clusters of elements of said design and while said step of performing logic optimization is performed on a third set of one or more clusters of elements of said design.

10. A method according to claim 9, further comprising the step of:
    performing a timing analysis on said design in parallel with said steps of placing, providing and performing logic optimization.

11. A method according to claim 1, wherein:
    said step of performing logic optimization includes providing alternative implementations of logic circuits.

12. A method according to claim 1, wherein:
    said step of performing logic optimization includes insertions of buffers.

13. A processor readable storage device having processor readable code embodied on said processor readable storage device, said processor readable code for programming one or more processors to perform a method comprising the steps of:
    placing circuit elements of a design;

provide routing or routing estimates for said design; and performing logic optimization on said design, said steps of placing, providing and performing logic optimization are performed concurrently for at least a portion of time, wherein one of said steps of placing, providing and performing logic optimization is performed on one portion of said design while another of said steps of placing, providing and performing logic optimization is performed on another portion of said design.

14. A processor readable storage device according to claim 13, wherein said method further comprises the step of:

performing a timing analysis on said design concurrently, for at least a portion of time, with said steps of placing, providing and performing logic optimization.

15. A processor readable storage device according to claim 13, wherein said method further comprises the step of:

performing a power analysis on said design concurrently, for at least a portion of time, with said steps of placing, providing and performing logic optimization.

16. A processor readable storage device according to claim 13, wherein said method further comprises the step of:

performing a timing analysis and a power analysis on said design concurrently, for at least a portion of time, with said steps of placing, providing and performing logic optimization.

17. A processor readable storage device according to claim 13, wherein:

said steps of placing, providing and performing logic optimization are performed by parallel processors.

18. A processor readable storage device according to claim 13, wherein:

said step of placing is performed on a first cluster of elements of said design while said step of providing is performed on a second cluster of elements of said design and while said step of performing logic optimization is performed on a third cluster of elements of said design.

19. A processor readable storage device according to claim 13, wherein said method further comprises the steps of:

dividing elements of said design into clusters;

performing an initial placement and routing estimation of said design prior to said steps of placing, providing and performing logic optimization; and performing an inner loop and an outer loop, said inner loop includes performing said steps of placing, providing and performing logic optimization on a current set of clusters, said outer loop includes reducing cluster size and performing said inner loop on said reduced clusters until said cluster size is at a predefined level.

20. An apparatus for performing design optimization, comprising:

a processor readable device; and one or more processors in communication with said processor readable device, said one or more processor perform a method comprising the steps of:

placing circuit elements of a design, providing routing or routing estimates for said design, and performing logic optimization on said design, said steps of placing, providing and performing logic optimization are performed concurrently for at least a portion of time, wherein one of said steps of placing, providing and performing logic optimization is performed on one portion of said design while another of said steps of placing, providing and performing logic optimization is performed on another portion of said design.

21. An apparatus according to claim 20, wherein:

said one or more processors include parallel processors for performing said method.

22. An apparatus according to claim 21, wherein:

said step of placing is performed by a first parallel processor while said step of providing is performed by a second parallel processor and while said step of performing logic optimization is performed by a third parallel processor.

23. An apparatus according to claim 21, wherein:

said step of placing is performed on a first set of one or more clusters of elements of said design while said step of providing is performed on a second set of one or more clusters of elements of said design and while said step of performing logic optimization is performed on a third set of one or more clusters of elements of said design.

24. An apparatus according to claim 21, wherein said method further comprises:

performing a timing analysis and a power analysis on said design concurrently, for at least a portion of time, with said steps of placing, providing and performing logic optimization.

* * * * *